United States Patent
Fougnies et al.

(10) Patent No.: US 10,495,414 B2
(45) Date of Patent: *Dec. 3, 2019

(54) DEVICES WITH NETWORK-CONNECTED SCOPES FOR ALLOWING A TARGET TO BE SIMULTANEOUSLY TRACKED BY MULTIPLE DEVICES

(71) Applicants: Douglas Fougnies, Scottsdale, AZ (US); Robert A. Pressman, Conshohocken, PA (US); Larry L. Day, Scottsdale, AZ (US)

(72) Inventors: Douglas Fougnies, Scottsdale, AZ (US); Robert A. Pressman, Conshohocken, PA (US); Larry L. Day, Scottsdale, AZ (US); Taylor J. Carpenter, Philadelphia, PA (US)

(73) Assignees: Douglas Fougnies, Scottsdale, AZ (US); Robert A. Pressman, Conshohocken, PA (US); Larry L. Day, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,330

(22) Filed: Apr. 22, 2019

(65) Prior Publication Data

US 2019/0316879 A1 Oct. 17, 2019

Related U.S. Application Data

(63) Continuation of application No. 16/057,247, filed on Aug. 7, 2018, now Pat. No. 10,267,598.

(Continued)

(51) Int. Cl.
*F41G 3/02* (2006.01)
*F41G 9/00* (2006.01)

(Continued)

(52) U.S. Cl.
CPC .......... *F41G 3/02* (2013.01); *F41G 1/38* (2013.01); *F41G 3/04* (2013.01); *F41G 3/065* (2013.01);

(Continued)

(58) Field of Classification Search
CPC ... F41G 3/02; F41G 1/38; G01C 17/00; G01S 19/13; G01S 19/47; H04W 84/18

(Continued)

(56) References Cited

U.S. PATENT DOCUMENTS 4,255,013 A 3/1981 Allen
4,418,487 A 12/1983 Strahan (Continued)

OTHER PUBLICATIONS

"Bluetooth SIG Adds Mesh Networking to BLE Ecosystem," posted on Jul. 17, 2017 by Circuit Cellar Staff, 2 pages, downloaded from web page: http://circuitcellar.com/cc-blog/bluetooth-sig-adds-mesh-networking-to-ble-ecosystem/.

(Continued)

*Primary Examiner* — Daryl C Pope
(74) *Attorney, Agent, or Firm* — Panitch Schwarze Belisario & Nadel LLP

(57) ABSTRACT

A network of scopes, including one or more lead scopes and one or more follower scopes, is provided to allow scope operators of the respective scopes to track the same presumed target. A lead scope locates a target and communicates target position data of the presumed target to the follower scope. The follower scope uses the target position data and its own position data to electronically generate indicators for use to prompt the operator of the follower scope to make position movements so as to re-position the follower scope from its current target position to move towards the target position defined by the target position data received from the lead scope.

14 Claims, 11 Drawing Sheets

Related U.S. Application Data

(60) Provisional application No. 62/544,124, filed on Aug. 11, 2017.

(51) Int. Cl.

| | |
|---|---|
| *F41G 3/16* | (2006.01) |
| *F41G 3/06* | (2006.01) |
| *F41G 1/38* | (2006.01) |
| *G01S 19/47* | (2010.01) |
| *G01S 19/13* | (2010.01) |
| *G01C 17/00* | (2006.01) |
| *F41G 3/04* | (2006.01) |
| *H04W 84/18* | (2009.01) |

(52) U.S. Cl.
CPC ............... *F41G 3/165* (2013.01); *F41G 9/00* (2013.01); *G01C 17/00* (2013.01); *G01S 19/13* (2013.01); *G01S 19/47* (2013.01); *H04W 84/18* (2013.01)

(58) Field of Classification Search
USPC ............................. 340/539.1, 539.11, 539.13
See application file for complete search history.

(56) References Cited

U.S. PATENT DOCUMENTS

| | | | |
|---|---|---|---|
| 4,531,321 A | 7/1985 | Bechtel | |
| 4,905,396 A | 3/1990 | Bechtel | |
| 4,949,089 A | 8/1990 | Ruszkowski, Jr. | |
| 5,052,790 A | 10/1991 | Edwards et al. | |
| 5,568,152 A | 10/1996 | Janky et al. | |
| 6,269,581 B1 | 8/2001 | Groh | |
| 6,862,833 B1 | 3/2005 | Gurtner | |
| 8,001,714 B2 | 8/2011 | Davidson | |
| 9,612,088 B2 | 4/2017 | Theriault | |
| 9,813,618 B2 | 11/2017 | Griffis et al. | |
| 10,267,598 B2 | 4/2019 | Fougnies et al. | |
| 10,408,573 B1 | 9/2019 | Fougnies et al. | |
| 2004/0134113 A1 | 7/2004 | Deros et al. | |
| 2007/0050139 A1 | 3/2007 | Sidman | |
| 2012/0236031 A1 | 9/2012 | Haddick et al. | |
| 2012/0320456 A1 | 12/2012 | Fujimoto et al. | |
| 2013/0187834 A1 | 7/2013 | Nohara | |
| 2013/0250284 A1 | 9/2013 | Lienhart et al. | |
| 2014/0157646 A1 | 6/2014 | McHale et al. | |
| 2014/0184788 A1 | 7/2014 | McHale et al. | |
| 2014/0281851 A1 | 9/2014 | McHale | |
| 2016/0091282 A1 | 3/2016 | Baker et al. | |
| 2016/0169625 A1 | 6/2016 | Richards | |
| 2017/0302852 A1 | 10/2017 | Lam | |
| 2019/0049219 A1 | 2/2019 | Fougnies et al. | |
| 2019/0226806 A1* | 7/2019 | Noller | F41G 1/545 |
| 2019/0249958 A1* | 8/2019 | Teetzel | F41G 11/004 |

OTHER PUBLICATIONS

Data Sheet for "TinymeshTM RF Transceiver Modules" RC11xx(HP)TM, RC25xx(HP)TM, RC17xx(HP)TM, Radiocrafts AS and Tinymesh, both located in Norway, downloaded from web page: https://radiocrafts.com/uploads/RCxxxxHP-TM_Data_Sheet.pdf, Copyright © 2016 Radiocrafts AS and Tiny Mesh AS, 86 pages.

Freedom on the Move (FOTM) Functional Overview, Copyright © 2017 Strongwatch | Freedom Surveillance, LLC, Last revised: Jun. 2018, 13 pages.

GOOGLE Cloud Vision API—Image Content Analysis. Downloaded from web page: https://cloud.google.com/vision, download date: Feb. 23, 2018, original posting date: unknown, 7 pages.

International Search Report and Written Opinion dated Oct. 25, 2018 in International Application No. PCT/US2018/046157.

Mathworks® documentation "Convert Earth-centered inertial (ECI) coordinates to azimuth, elevation, slant range (AER) coordinates." Downloaded from web page: https://www.mathworks.com/help/aerotbx/ug/eci2aer.html, download date: Jul. 5, 2018, original posting date: unknown, 6 pages.

Product brochure for "InertialSense® Micro Navigation Systems." Downloaded from web page: https://inertialsense.com/, product release date: unknown, Copyright © 2016, Inertial Sense, LLC, Salem, Utah, 11 pages.

Product description for "Terrain Navigator Pro." Trimble® subsidiary MyTopoTM, Billings, Montana, downloaded from web page: https://www.terrainnavigator.com/ Download date: Jul. 2018, product release date: unknown, 1 page.

VectorNav Technologies—MEMES-based Inertial Sensors. Downloaded from web page: https://www.vectornav.com/, download date: Aug. 9, 2017, product release date: unknown, 4 pages.

VectorNav Technologies, LLC, Dallas, Texas, "VectorNav Launches Dual-Antenna GPS-Aided Inertial Nav System." (VN-300) GPS World, May 13, 2014, downloaded from web page: http://gpsworld.com/vectornav-launches-dual-antenna-gps-aided-inertial-nav-system/, 4 pages.

Wikipedia entry for "Compass" Page last edited Aug. 1, 2018, original posting date: unknown, 11 pages.

Wikipedia entry for "Telescopic Sight." Page last edited Jun. 25, 2018, original posting date: unknown, 14 pages.

* cited by examiner

| Select | Object |
|--------|--------|
|        | human  |
| √      | deer   |
|        | vehicle |

FIGURE 5

DEVICES WITH NETWORK-CONNECTED SCOPES FOR ALLOWING A TARGET TO BE SIMULTANEOUSLY TRACKED BY MULTIPLE DEVICES

CROSS-REFERENCE TO RELATED APPLICATION

This application is a continuation of copending U.S. patent application Ser. No. 16/057,247 filed Aug. 7, 2018, which is incorporated herein by reference.

This application claims the benefit of U.S. Patent Application No. 62/544,124, filed Aug. 11, 2017, the disclosure of which is hereby incorporated herein by reference in its entirety.

BACKGROUND OF THE INVENTION

A sight or optical viewer which incorporate lenses to magnify an image or simply passes through light without magnification, also referred to as a "scope," is a sighting device that is based on an optical refracting telescope or other optical viewing device. It includes some form of graphic image pattern (a reticle or cross-hairs) mounted in an optically appropriate position in its optical system to give an accurate aiming point. Telescopic sights are used with all types of systems that require accurate aiming but are most commonly found on firearms, particularly rifles. A telescopic sight may include an integrated rangefinder (typically, a laser rangefinder) that measures distance from the observer's sighting device to a target.

A compass is an instrument used for navigation and orientation that shows direction relative to the geographic "cardinal directions,", or "points.". A "compass rose" diagram shows the directions north, south, east, and west as abbreviated initials marked on the compass. When the compass is used, the rose can be aligned with the corresponding geographic directions, so, for example, the "N" mark on the rose really points to the north. In addition to the rose or sometimes instead of it, angle markings in degrees may be shown on the compass. North corresponds to zero degrees, and the angles increase clockwise, so east is 90 degrees, south is 180, and west is 270. These numbers allow the compass to show azimuths or bearings, which are commonly stated in this notation.

GPS data typically provides a three-dimensional location (latitude, longitude, and altitude (elevation)). For example, a sample GPS of a location in Philadelphia is as follows:
Latitude: 39.90130859
Longitude: −75.15197754
Altitude (elevation) relative to sea level: 5 m Miniaturized GPS devices are known that include a GPS receiver for providing GPS location data and an orientation sensor for providing attitude data. The orientation sensor may derive its data from an accelerometer and a geomagnetic field sensor, or another combination of sensors. One such miniaturized GPS device that is suitable for use in the present invention is a device that is commercially available from Inertial Sense, LLC located in Salem, Utah. This device is marketed as "µINS" and "µINS-2." ("INS" is an industry abbreviation for "Inertial Navigation System.") The µINS" and µINS-2 are GPS-aided Inertial Navigation Systems (GPS/INS). A GPS/INS uses GPS satellite signals to correct or calibrate a solution from an inertial navigation system (INS).

Another known miniature GPS/INS that is suitable for use in the present invention is a device that is commercially available from VectorNav Technologies, LLC located in Dallas, Tex. This device is marketed as "VN-300" and is a dual-antenna GPS/INS. The dual-antenna feature in the VN-300 allows it to provide accurate compass data.

Network technology is well known in the art. Each device in a network is often referred to as a node and nodes can be formed into a network using a variety of network topologies including hub and spoke and mesh. In a cellular based communication system, nodes communicate through one or more base stations which in turn are directly or indirectly connected to a mobile switching center (MSC). MSCs are interconnected based on industry standards which enable nodes in a cellular network to communicate with other nodes that are connected to different based stations. There are numerous cellular standards such as GSM, LTE and CDMA and a common feature in cellular networks is the capability of allowing nodes to connect to the Internet.

Broadband satellite communication systems use one or more communication satellites organized into a constellation. There are numerous commercially available satellite systems including systems operated by Globalstar, Iridium and Inmarsat. Like cellular, broadband satellite communication systems allow nodes to connect to the Internet. In cellular terms, each satellite in the constellation acts as a base station and nodes in the system connect to a satellite that is in range. One advantage of satellite systems is that coverage is sometimes better in remote areas.

Wireless Local Area Network (WLAN) technology allows nodes to establish a network. Common WLAN standards including 802.11a, b, g and n. 802.11s is a WIFI based mesh networking standard. Bluetooth® is another standard for connecting nodes in a network and mesh networking capability has recently been added to the Bluetooth LE standard by the Bluetooth Special Interest Group. Accordingly, through various standards, it is possible to implement point to point, point to multipoint and mesh WLAN, all of which are suitable for use with the present invention.

Mesh network topology has significant advantages for mobile devices, particularly in remote areas where there is limited cellular service since each node can be connected to multiple other nodes and there is no required path from any node in the network to any other node. A further advantage of a mesh network is that as long as any one node in the mesh network has access to the Internet such as by way of a cellular or satellite connection, all of the nodes in the mesh network have access.

A representative wireless mesh networking chipset that is suitable for use with the present invention is the RC17xx (HP)™ (Tinymesh™ RF Transceiver Module), which is commercially available from Radiocrafts AS and Tinymesh, both located in Norway. The chipset incorporates the Tinymesh application for the creation of mesh networks. The ideal mesh network chipset for the present invention is small, and has high power and a long range, and should operate in unlicensed spectrum.

SUMMARY OF THE INVENTION

A network of scopes, including one or more lead scopes and one or more follower scopes, is provided to allow scope operators of the respective scopes to track the same presumed target. A lead scope locates a target and communicates target position data of the presumed target to the follower scope. The follower scope uses the target position data and its own position data to electronically generate indicators for use to prompt the operator of the follower scope to make position movements so as to re-position the follower scope from its current target position to move towards the target position defined by the target position data received from the lead scope.

BRIEF DESCRIPTION OF DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 5 shows a sample preset list that may be displayed on a display of scope in accordance with one preferred embodiment of the present invention.

DETAILED DESCRIPTION OF THE INVENTION

Figure 1A:
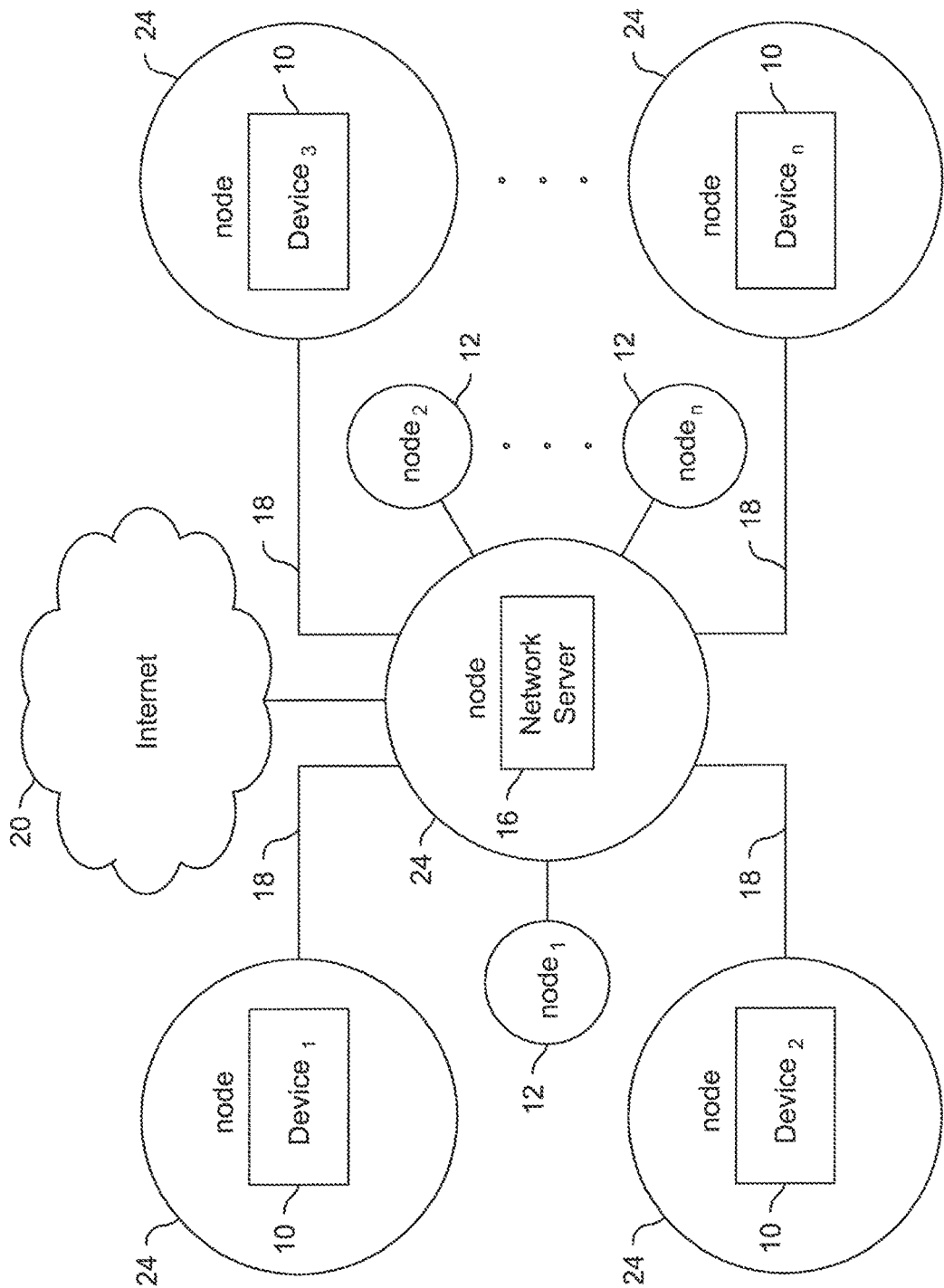
FIGS. 1A, 1B, 2 and 3 are schematic diagrams of system components in accordance with preferred embodiments of the present invention.

Certain terminology is used herein for convenience only and is not to be taken as a limitation on the present invention.

Preferred embodiments of the present invention provide for devices having network-connected scopes which are designed to hone in on the same target, which may be a still or moving target. In a first embodiment involving two scopes, a "lead scope" identifies a target and communicates location data regarding the target to a "follower scope" which uses the location data from the lead scope and its own location and orientation data to hone in the target. In the two scope configuration, the lead scope and the follower scope communicate through any available wireless data communication technology including cellular, satellite or one or more WLAN technologies.

In a second embodiment involving a plurality of scopes, a first scope identifies a target and communicates location data regarding the target to a plurality of other scopes which use the location data from the first scope and their respective location and orientation data to hone in on the target. In this embodiment, as additional scopes locate the target, they communicate their location data regarding the target to a network server which amalgamates location data that is accumulated from each scope that identified the target to define successively more precise location data of the target (i.e., more data points increase the precision of the location), which is then communicated to the scopes that have not yet located the target. The scopes that have previously reported the location of the target may also receive the latest location data of the target to assist in tracking the target. The scopes in this embodiment can be connected using any available WLAN technology but in the preferred embodiment, a mesh networking technology is used to enable the plurality of scopes to communicate with each other. It is understood that any one of the scopes can perform the functions of the network server or the functions of the network server can be distributed among the plurality of scopes for redundancy in case one of the scopes loses connectivity to the WLAN. Ideally, at least one of the scopes is connected to the Internet and the other scopes in the network are thus able to access the Internet through the connected scope by way of the mesh network.

Since the target may be a moving object, the location data of the target for the scopes that have identified the target is continuously streamed to the scopes that have not yet located the target. Alternatively, the location of the target is only sent when the lead scope activates a switch that designates the target. In a more advance version of the system, when the target is moving, the scope and/or the network server will predict the future location of the target assuming continued movement in the same direction using known techniques.

I. Definitions

The following definitions are provided to promote understanding of the present invention.

device—The device is the object that a scope is integrated into. Examples of such devices include a rifle, gun, binoculars, smart eyeglasses or goggles, helmet visor and a drone. Certain types of devices are themselves "scopes," such as binoculars, telescopes and spotting scopes. The device may be handheld or may be mounted on a land, aerial or water based vehicle.

target—The target is the object of interest. It may be a person, animal or object, and may either be stationary or moving.

lead scope—The lead scope is the first scope that identifies a target. In the first embodiment, there is only one lead scope. In the second embodiment, the lead scope is only the first scope that located the target. Subsequent scopes that identify the target are simply referred to herein as "scopes." In one preferred embodiment, any scope in the network can function as a lead scope.

follower scope—The follower scope is a scope that attempts to hone in on the same target that the lead scope identified. In the first embodiment, there may be one or more follower scopes. In the second embodiment, the follower scopes include all of the scopes that have not yet honed in on the target that the previous set of scopes (including the lead scope) has identified.

In one preferred embodiment, any scope in the network can function as a follower scope.

II. Detailed Description

The description below presumes that each of the device's scopes have similar functionality and can function as either a lead or follower scope. However, in an alternative embodiment, certain scopes may be dedicated to a lead or follower role, and certain scopes may have more or less functionality than other scopes.

A device having a scope includes each of the following measurement devices (or their equivalents):

1. GPS/INS device (provides location data of the device) (could be implemented as two or more distinct devices such as a GPS receiver, gyroscope and accelerometer)

2. rangefinder (provides the distance from the device's scope to the target). In the preferred embodiments, laser technology is used by the rangefinder to detect range but other technologies such as optical distance measurement could also be used. One example of an optical distance measurement system uses a series of lenses and mirrors to produce a double image and a dial or other controller with distance indicia is adjusted to bring the two images into alignment.

3. compass (provides the direction of the target relative to the position of the scope (north, south, east, and west)). The compass may be a standalone device, or may be incorporated into the GPS/INS and determine direction using GPS compassing. GPS compasses often have two antennas and if the device is a pair of binoculars, one option would be to place an antenna on each barrel. Accuracy can be increased by increasing the separation of the antennas used by the GPS compass such as through the use of one or more fold-out arms, booms, lighter than air balloons or other mechanical means to obtain separation, or by connecting a second antenna through an RF or optical connection.

4. orientation sensor (provides attitude data, namely, the pointing angle of the device relative to a fixed level plane (e.g., zero degrees if pointing straight ahead, 30 degrees up if pointing at a bird or plane in the sky or −10 degrees if pointed down into a valley)

5. elevation sensor (optional) (provides absolute elevation above sea level or other reference point). This would typically be a barometric sensor that would supplement the accuracy of the elevation determined by the GPS/INS which, in some cases is not particularly accurate. Alternatively, an ultrasonic or other proximity sensor may be used to determine the distance to the ground if the GPS/INS either incorporates or has access to a topographic map though a network connected scope. For example, if the GPS position corresponded to a position on a topographic map that is 500 feet above sea level and the proximity sensor determines that the distance from the scope to the ground is 5 feet, an accurate elevation of 505 feet would be known by the scope.

Data from these measurement devices are used to calculate the position of the target, which may be expressed in GPS coordinates or the like.

As discussed in detail below, for each above identified measurement devices, there are varying degrees of accuracy and an anticipated error range. As the technology associated with the measurement devices improves, it will be possible to improve the operation of the scope and provide a more accurate prediction of the target location by using more accurate measurement devices.

A. Example Steps for First Embodiment

1. The operator of a device that contains the lead scope identifies a presumed target.

2. The operator of the device either centers a cross-hair or other target indicia to the center of the target or using a pointing device such as a touchpad or eye tracking sensor, causes a cross-hair to move to the center of the target.

3. The operator optionally presses a button to cause the target to be designated.

4. If not operating in a continuous manner based on the position of the cross-hairs, the rangefinder is activated and the data from the measurement devices is stored in memory.

5. The lead scope calculates a local AER (azimuth, elevation, range) position of the target based on the stored directional and range measurement data. A calculation is then made using the stored positional measurement data to convert the local AER position to a global position. In the preferred embodiment, the global position is designated as GPS coordinates. In some cases, an accuracy or estimated error associated with the target position is also determined by the lead scope. An alternative implementation which obtains the same result involves the wireless transmission of the stored measurement data, as opposed to the position data to the follower scope or other device connected to the network such as a network server. In this alternative embodiment, the follower scope or network server calculates the target position and, in some cases, the estimated error or accuracy, from the measurement data. Either the determined position data and error or accuracy data (if collected or determined) or the measurement data is transmitted to the follower scope. Through the above operations, either one or more follower scopes will wirelessly receive the position data or calculate it from the received measurement data transmitted by the lead scope.

6. If the system includes a network server and the network server receives the raw data from the measurement devices transmitted by the lead scope, it calculates the target position and stores the data. If the network server receives the calculated target position, it stores this data and forwards it to other scopes. It is understood that the system can be operated without a network server and that the features described as being performed by the network server could be performed by any scope or device in the network or by a remote network server to which the scopes are connected via the Internet.

7. A follower scope on another device wirelessly receives either from the lead scope or from the network server the target position calculated by the lead scope.

8. The device containing the follower scope also includes the same set of measurement devices (or their equivalents). The follower scope uses its own location data and the target position to calculate the bearing and attitude where the follower scope should aim so as to be pointing at the same target position as the lead scope. As an alternative, the follower scope could include a reduced set of measurement devices and operate with reduced functionality. For example, if the rangefinder was not included in the follower scope, it would have limited functionality as a lead scope.

9. Visual (guiding) indicators are displayed on the device of the follower scope to direct (guide) the operator of the follower scope as to where the scope should be moved to so as to lock in on the target position. For example, an eyepiece of the follower scope may include the visual indicators. Alternatively, a device or scope-mounted display may provide the visual indicators. The visual indicators may be directional arrows, LED lights, text messages (e.g., move left, move up), or the like. Audio indicators may be used as well.

10. If the lead scope moves its physical position or its aiming position and indicates that the target has been re-located, the calculations are automatically rerun and sent to the follower scope so that the follower scope can continue to search for the target. Likewise, if the follower scope moves from its initial position, the calculations at the follower scope of the vector to the target must be redone, even if no changes are made to the physical position or aiming position of the lead scope so as to update the guiding indicators display within the follower scope.

In an alternative embodiment, only the raw measurement data from the lead scope is passed along to the network server or other scope and each follower scope uses the raw measurement data from the lead scope to calculate the target position of the lead scope. That is, if the follower scope receives the raw measurement data, it must perform the target position calculation of the lead scope before it can determine the relative position of its own device to the target.

Additional options include the ability of the lead scope to capture a digital image of the target using a digital image sensor incorporated into or attached onto the scope and transmit the digital image to the follower scope so that the operator of the follower scope would know what it is looking for. A further option would be for the follower scope to signal back to the lead scope that it sees the target and to transmit a digital image of its view of the target. Capturing a digital image of the target could have unique applications in military and law enforcement. For example, if at least one of the scopes is connected to the Internet and the digital image is a human face, the digital image could be transmitted through the Internet to a database that would attempt to match the face using facial recognition. If a match is identified, additional information about the target could be provided to each of the scopes. As an alternative to conventional face recognition, other biometric measures can be captured and transmitted such as gait and facial blood vessel patterns which when used with a thermal imager can form a digital fingerprint of a human face.

In the above description, it is assumed that a conventional optical system is used to capture the image. However, alternatives such a night vision and forward looking infrared could also be used.

B. Example Steps for Second Embodiment

The steps of the second embodiment are similar to the first embodiment, except that a network server (which as noted above could be one or more of the scopes in the network) performs additional calculations as described above to amalgamate the estimated location data that is accumulated from each scope that identified the target to define successively more precise location data of the target (i.e., more data points increase the precision of the location), which is then communicated to the scopes that have not yet located the target. Additionally, the network server can store multiple targets (such as from multiple lead scopes) and communicate those to each follower scope in the network.

C. Examples of Uses for the Network-Connected Scopes

Connected rifle scopes: two hunters are hunting. One hunter spots a prey and signals to the other hunter to lock in their scope on the same prey. If the scopes are equipped with image capture and display devices, the image of the prey could be sent from the first hunter to the second hunter and the second hunter could signal the first hunter using the connected scope that it has seen the target and potentially transmit the image that it has seen back to the first hunter. If the first hunter has lost the target, the second hunter would then become the lead scope and transmit the position of the target (or raw measurement data) back to the first hunter who would attempt to reacquire the target.

Connected binoculars: two birdwatchers are birding. One birdwatcher spots a bird and signals to the other birdwatcher to lock in their binoculars on the bird.

Connected drones and rifle scopes: A drone operated by a law enforcement agency identifies the position of a suspected shooter in a field. Police armed with connected rifle scopes are directed to the suspected shooter position data as initially determined by the drone and as further refined by subsequent position data collected from police who subsequently identify the shooter in their connected rifle scopes.

D. System Architecture

FIG. 1A shows a system view wherein a plurality of devices 10 (device$_1$-device$_n$) and non-device/non-scope nodes 12 (node$_1$-node$_n$) are in communication with a network server 16 via wireless communication and an electronic network 18. The electronic network 18 is represented by the solid lines connecting the devices 10 to the network server 16. The electronic network 18 may be implemented via any suitable type of wireless electronic network (e.g., local area network, wide area network (the Internet)). The functions of the one or more non-device/non-scope nodes 12 ((node$_1$-node$_n$) are described below. In FIG. 1A, at least the network server 16 is connected to the Internet 20.

Figure 1B:
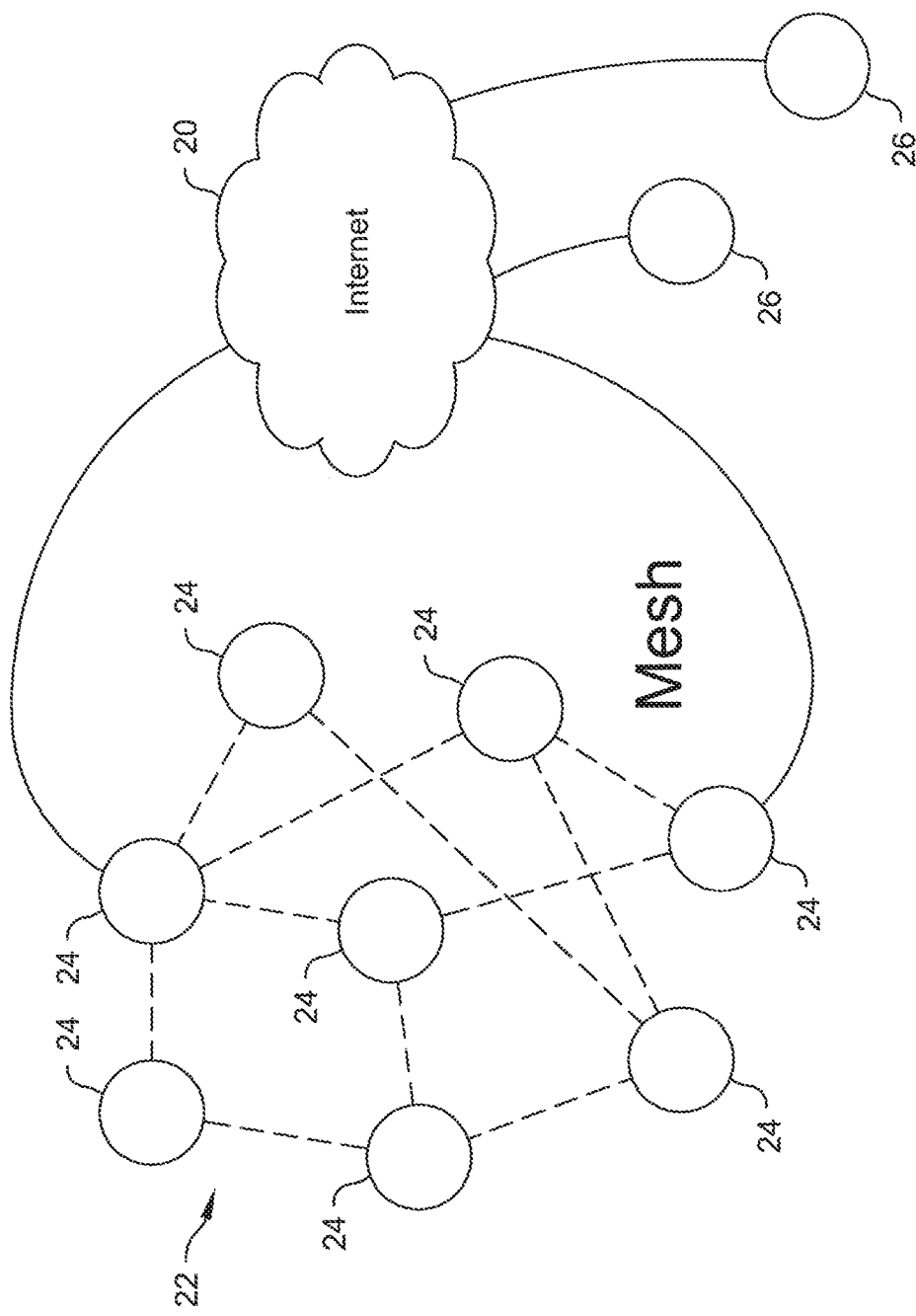

FIG. 1B shows the topology of a mesh network 22 that is suitable for use in preferred embodiments of the present invention. Preferably, the plurality of devices 10 and the network server 16 are nodes 24 in the mesh network 22, and thus these elements are labeled as nodes 24 in FIG. 1A. In this manner, each of the nodes 24 are capable of being in communication with each other via the mesh network 22. In this configuration, either the network server 16 becomes another node 24 in the mesh network 22, or there is no network server 16, or one or more of the device scopes perform functions herein described as being performed by the network server 16. In FIG. 1B, at least one of the nodes 24 is connected to the Internet 20. Additionally, there may be one or more nodes 26 that are outside of the mesh network 22, but which can communicate with nodes 24 in the mesh network 22 via the Internet 20.

The scope of the present invention includes other types of network topologies and is not limited to a hub and spoke network architecture with a server at the hub. The devices/nodes may be directly connected to each other wirelessly (e.g. by way of a point to point connection which could also be an ad-hoc network). Each device/node may have a cellular or satellite connection and connect with each other through the cloud (i.e., the Internet). Each device/node may connect with each other through a wireless router that may be land-based or aerial such as in a tethered hot air balloon or drone programmed to stay in a fixed aerial location.

Furthermore, in the second embodiment, devices/nodes may connect to the network in different fashions. For example, in a six node network, five of the nodes could be in range of the mesh network 22. However, the sixth node could be out of range and connected to the network by a cellular or network signal via the Internet 20.

Figure 2:
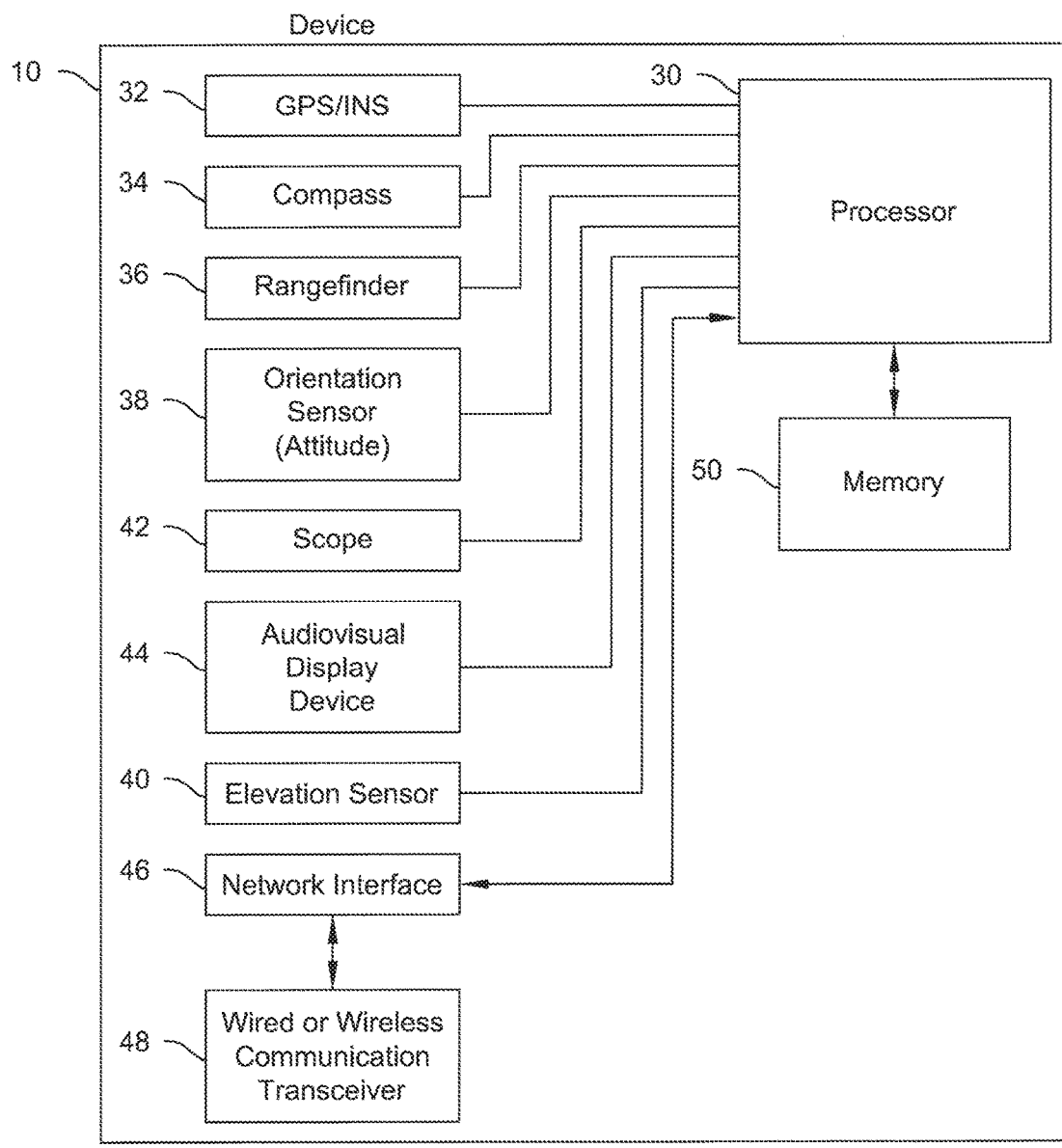

FIG. 2 shows elements of a sample device 10, which may include (or may be) either a lead scope or a follower scope. The device 10 includes a processor 30 connected to at least the following elements:
1. GPS/INS 32
2. compass 34 (which can be either standalone or integrated into the GPS/INS)
3. rangefinder 36
4. orientation sensor 38 (attitude)
5. elevation sensor 40 for improved accuracy (optional)
6. scope 42 (the structure of the scope will depend upon the type of device)
7. audiovisual display device 44 (which can be either standalone or integrated into the scope)
8. network interface 46 in communication with a wired or wireless communication transceiver 48
9. memory 50

The audiovisual display device 44 is the element that provides prompts/messages and indicators to the user. In follower scopes, information provided by the audiovisual display device 44 assists the user in honing in on the target. Depending upon the type of device 10 and the environment that the device 10 is used in, there may be only video, only audio, or both audio and video provided by the audiovisual display device 44.

Figure 3:
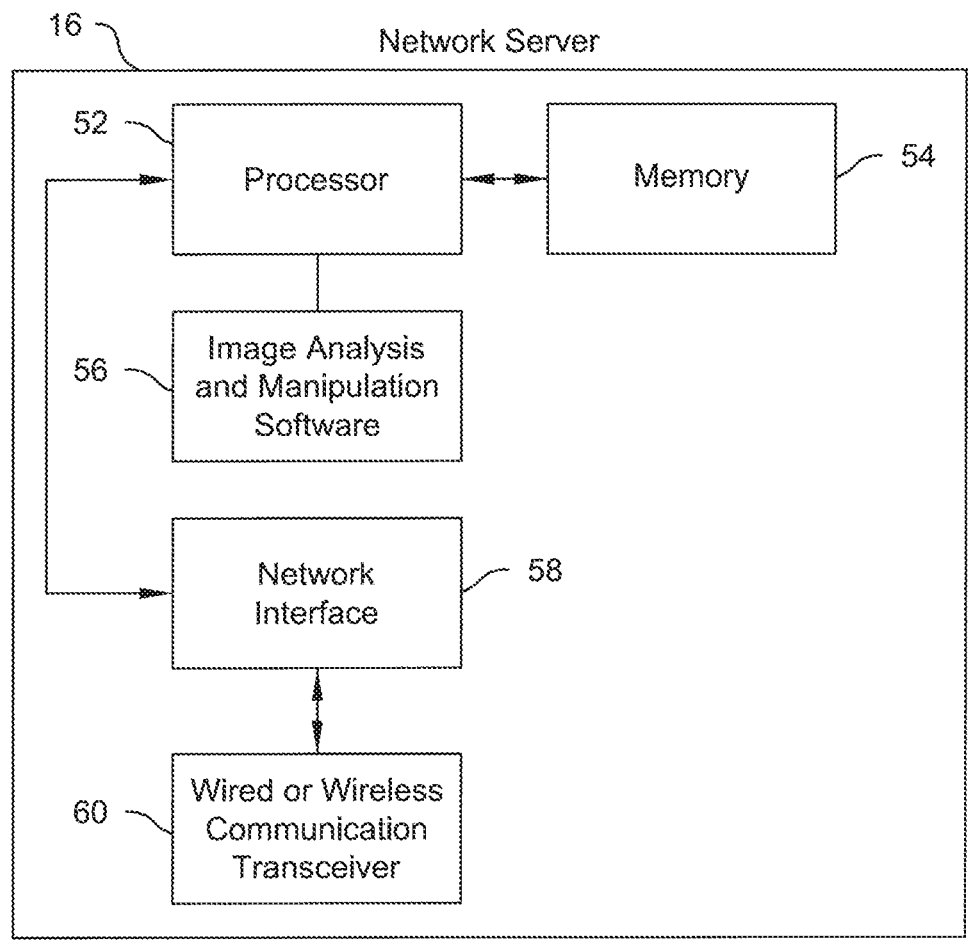

FIG. 3 shows elements of the network server 16, including a processor 52, memory 54, image and analysis and manipulation software (IAMS) 56 which can implemented using artificial intelligence software, and a network interface 58 in communication with a wired or wireless communication transceiver 60.

The processor functions of the individual devices 10 and the network server 16 depend upon the system architecture and the distribution of computing functions. As described herein, some of these functions can be performed at either processor 30 or 52, whereas other functions may be performed by the network server's processor 52.

Figure 4A:
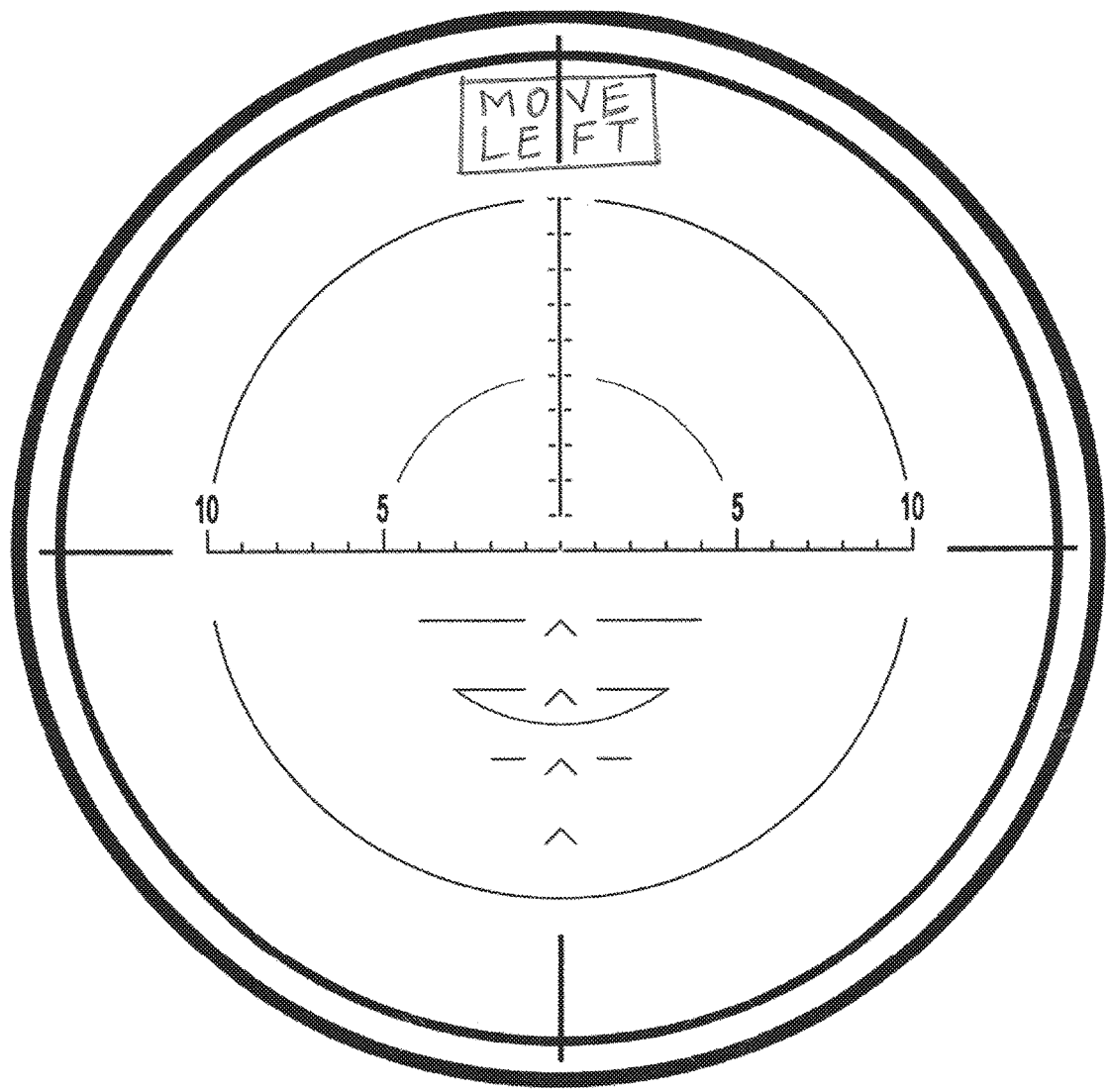
FIGS. 4A-4C are optical sights in accordance with preferred embodiments of the present invention.
Figure 4B:
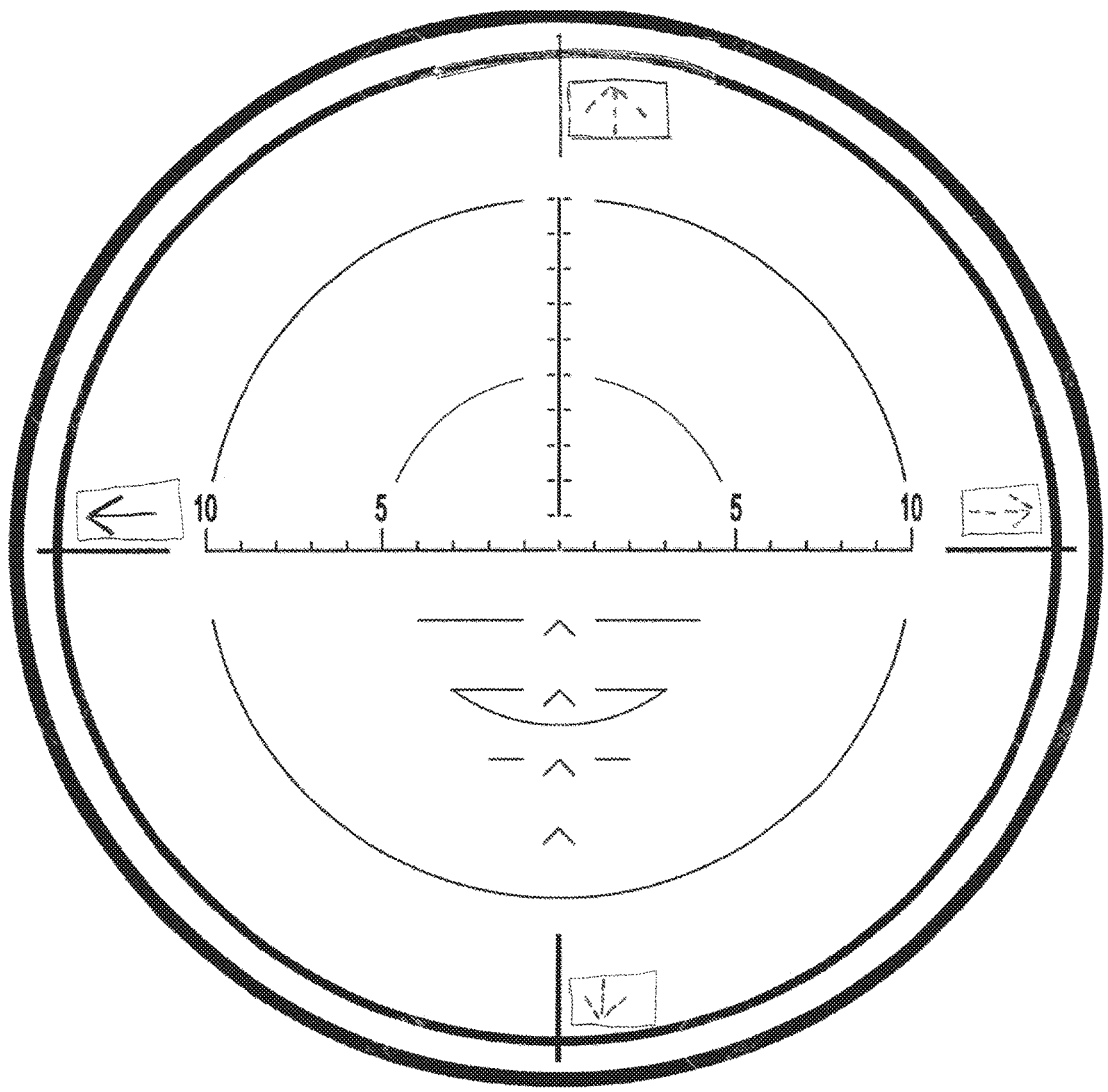
Figure 4C:
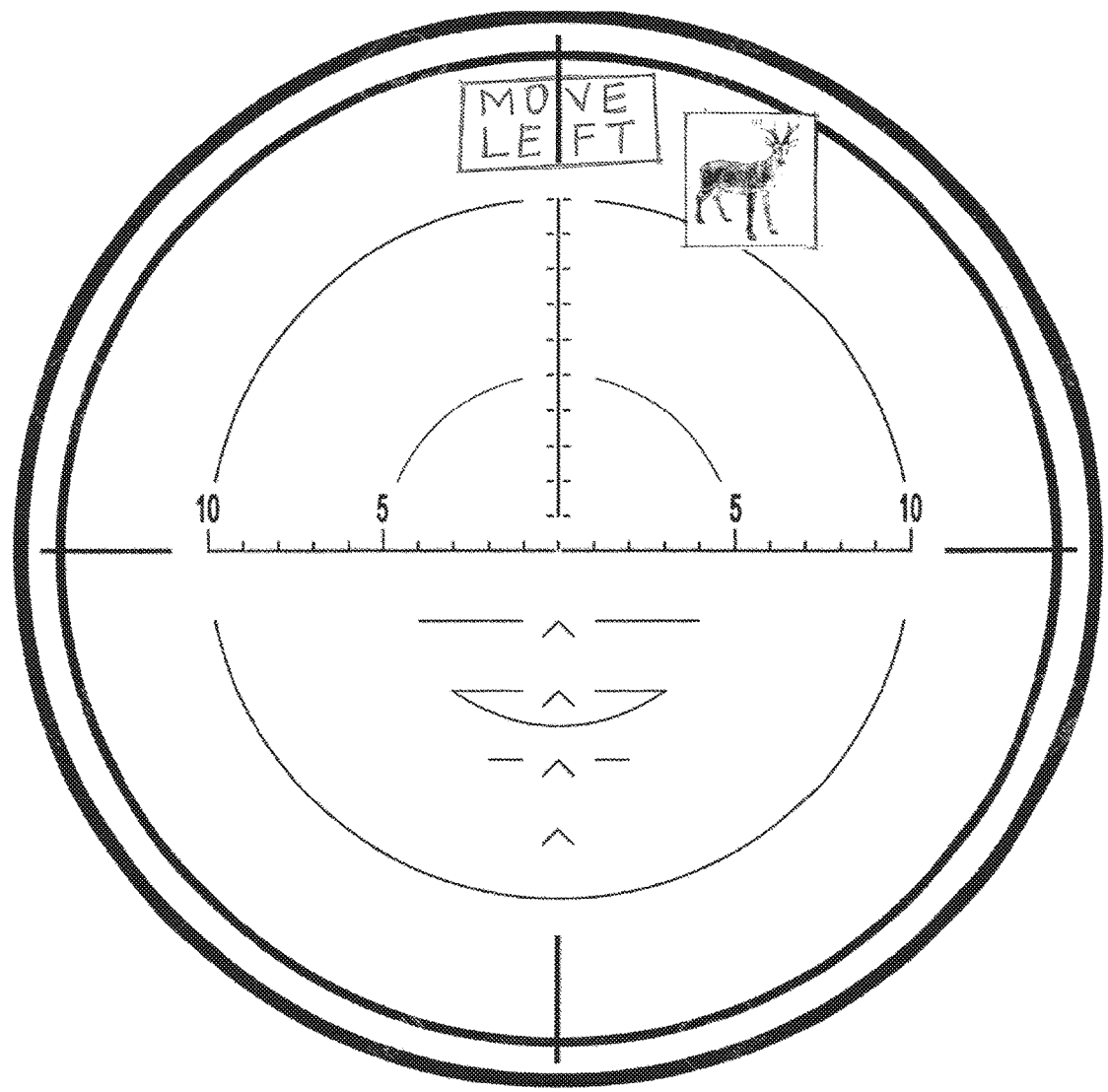

FIGS. 4A-4C each show an optical sight (scope) for a rifle having an integrated audiovisual display device. In FIG. 4A, the display device is located at the zero degree position and presently reads "MOVE LEFT." In FIG. 4B, the display device has four separate areas, at zero, 90, 180 and 270 degrees. The display device in FIG. 4B is currently indicating to move left (left arrow at 270 degrees is on indicated by a solid line, whereas the other three arrows for up, right and down, are off, as indicated by dashed lines). FIG. 4C is similar to FIG. 4A, except that it includes an additional display element that shows the image that the user should be trying to locate. The direction prompts in these figures indicates that this rifle is presently functioning as a following scope.

III. Additional Considerations

A. Target Position Weighting

When calculating a presumed target position from GPS data and the other measurement devices, there are known, quantifiable errors introduced by the lead scope and follower scope(s), which can be represented by discrete values (e.g., +/−20 cm). Certain types of errors will be consistent from scope to scope based on inherent limitations of the measurement devices. Other types of errors may depend upon signal strength, such as the strength of a GPS signal or number of satellites used to calculate the position of the lead scope. For each calculated target position, the lead scope, follower scope and/or network server identifies the error value. When amalgamating and accumulating target positions from multiple scopes to calculate an updated target position, the error values may be used to weight the strength given to each target position.

Various algorithms may be used to process the target positions. For example, target positions with the lowest error values may be more highly weighted. Alternatively, a target position with a very high error values compared to other target position error values may be deleted from the calculation. One way to use the additional data to more accurately predict the position of the target would be to place points representing each estimated target position on a 3-dimensional grid and estimate the center point or average location of the data representing the estimated targets. The center point can be adjusted based on weighting as discussed above.

In addition to using error values for target position weighting, a temporal factor may be used. For example, the most recently observed target positions may be given greater weighting. Certain target positions may be eliminated entirely from the weighting after a predetermined period of time has passed from the observation time.

The temporal factor may also be affected by the nature of the target for embodiments where the type of target is determined (e.g., car, person, deer) by the LAMS and/or by the scope. The temporal factor is likely to be more important for fast-moving targets compared to slow-moving targets. Thus, for a fast moving target (e.g., a car), the most recently observed target positions may be given significantly greater weighting, and older target positions would likely be eliminated more quickly from the weighting compared to slower moving targets.

Since a normally fast moving target might not actually be moving (e.g., a stationary car), and a normally slow moving target may actually be moving fast (e.g., a running person or deer), the LAMS may also use various algorithms to determine if the target is actually moving, and if so, at what speed. This calculation may then be used for the temporal factor. For example, if a target appears to be stationary, then no temporal factor will be applied to the weightings. The algorithm may look at multiple observed target positions and if they are relatively similar after factoring in their respective error values, and were observed at significantly different time intervals (i.e., not very close in time), it can be concluded that the target is stationary. Conversely, if multiple observed target positions are significantly different after factoring in their respective error values, and were observed very close in time, it can be concluded that the target is moving, and the temporal factor should be used in the weighting.

B. Error Indicator

In one preferred embodiment, the visual indicator visually communicates the error information in a form that is useful to the device operator. For example, if the presumed target position is represented by a dot on a display screen of the device, an error box may by overlaid around the dot so that the operator of the device knows that the target may be in any of the areas within the error box, and is not necessarily exactly where the dot is showing. In the second embodiment, the error box presumably becomes smaller as more target positions are identified by a succession of follower scopes.

The exact manner in which the error information is communicated depends upon how the presumed target position is displayed on a follower device.

Advances in measurement sensors, particularly GPS technology, will improve accuracy and reduce errors. At some point, the errors may be sufficiently small that an error indicator would not enhance the user experience.

C. Image Display and Simulation

In one embodiment, the target is represented by a one-dimensional object on a display screen, such as a dot. In an alternative embodiment, the target is represented by a simulated two-dimensional or three-dimensional image on the display screen. If a digital image is captured and transmitted, the actual image of the target may be displayed on the screen. Using image analysis and manipulation software (IAMS) which could be implemented using artificial intelligence (AI) techniques such as a neural network, the simulation process allows for the target to be rotated so that it appears properly positioned with respect to the follower scope. Consider the following example:

1. A lead scope identifies a deer (target) that is a quarter-mile away and is facing the device head-on.

2. The target position of the deer and a physical image of the deer is captured by the scope and communicated to the network server.

3. The IAMS in the network server or remotely accessed via the Internet identifies key visual features within the image and compares these features with known objects to categorize the target as a front view of the deer and retrieves a simulated image of a deer from its database.

4. A follower scope receives target position data regarding the deer and it is determined that the follower scope is also about a quarter-mile from the deer, but is 90 degrees off compared to the lead scope. The IAMS can then rotate the simulated deer by 90 degrees and communicate a side view of the deer for display on the follower scope so that the follower scope knows what the deer is likely to look like.

5. After physical image data is captured from a plurality of scopes, the IAMS can build a 3-D image of the target, thereby enabling a more realistic view of the target to be displayed on the follower scopes that are still looking for the target. The IAMS must know the positions of both the lead scope and the follower scope to perform the rendering since both positions are necessary to know how to rotate the 3-D image of the target. If actual images are captured, one option would be for the IAMS to combine the actual image data rather than simulate the image.

6. In law enforcement applications, the IAMS could attempt to match the target image to a person using facial recognition or other biometric techniques. If there is a match, information about the target could be returned to the scopes.

7. A further application of an image display system incorporated into the scopes would be the ability of the follower scope to retrieve a high-resolution aerial image or topographical map and display the aerial image or map on the display of the follower scope together with some indicia of the approximate location of the target. If error information is known, a box can be displayed on the aerial image or topographical map showing the area in which the target may be located. By combining the features of directing the scope to the target, providing an image of the target as seen by the lead scope and providing an aerial view or topographical map including the approximate position of the target together with an error box, the process of finding a target is greatly accelerated.

In a third embodiment, the target is represented by a bounding box or highlighted image segment on the display when present in the scope's field-of-view. If a digital image of the target is captured, the IAMS may be used to identify key visual features within the image that allows recognition of the target object in future collected images. When the field-of-view of the follower scope nears the target, the digital image buffer of the follower scope field-of-view is processed by the IAMS to determine if there is a pattern match between the key visual features of the target identified previously and features within the current field-of-view. Upon finding the target image features, the target is visually indicated. If the follower scope has an optical display, one embodiment includes a transparent display overlay that is activated to highlight a target in a particular color or draw a box around the target. If the follower scope has a visual display, the matched target is designated as described above. Consider the following example:

1. A lead scope identifies a deer (target) that is a quarter-mile away and is facing the device head-on.

2. The target position of the deer and a physical image of the deer is captured by the scope and communicated to the network server.

3. The IAMS in the network server or remotely accessed via the Internet uses computer vision techniques to segment the image, separating the target from the background image.

4. The IAMS generates a set of key identifiable features within the image segment, such as the points on the deer's antlers and a white patch on its side.

5. A follower scope receives target position data regarding the deer and it is determined that the follower scope is also about a quarter-mile from the deer, but is 45 degrees off compared to the lead scope. The IAMS can then rotate the visual feature-set corresponding to the target by 45 degrees so that it knows what the features should appear as in the follower scope's field-of-view.

6. The follower scope aims in the general direction of the target, guided by the instructions regarding the target's location. Images of the current field-of-view of the follower scope are sent to the IAMS as the follower scope moves for processing.

7. The IAMS performs pattern matching on the incoming follower scope images, comparing key features within the image with the target feature-set generated from the target scope and adjusted for the follower scope's viewing angle. If a pattern match occurs, the location of the target, within the follower scope field-of-view, is transmitted to the follower scope.

8. The follower scope presents a bounding-box overlay highlighting the location of the target within the display.

9. After physical image data is captured from a plurality of scopes, the IAMS can build a larger set of key identifying features from multiple angles.

D. Target Position Calculations

Calculation of a target position from the measurement data may be performed by any one of known techniques which rely upon GPS data. U.S. Pat. No. 5,568,152 (Janky et al.), which is incorporated herein by reference, discloses a methodology for determining the location of a target by an observer who is spaced apart from the target and who is viewing the target through a viewer/rangefinder. U.S. Pat. No. 4,949,089 (Ruszkowski, Jr.), which is also incorporated herein by reference, discloses a similar methodology. Any such methodologies may be used to calculate the target position.

To calculate the position of a follower scope relative to the target, one must effectively perform the reverse of the calculations of the lead scope. The follower scope knows its GPS coordinates and it has received the approximate GPS coordinates of the target from the lead scope or network server (or calculated the target position based on directly or indirectly wirelessly receiving the raw measurement data from the lead scope. With this information, the follower scope (or the network server or another node in the network) calculates a route between the two GPS coordinates. Unlike a vehicle route where you are effectively only determining a two-dimensional direction from point A to Point B, the follower scope also determines a precise vector and range from its position to the position of the target. Since the follower scope also has a GPS/INS device, it uses the information concerning the calculated vector to the target to direct the user to point the follower scope in alignment with the vector to the target.

Consider the following example: Assume that the follower scope determines that the device user is presently looking due west (270 degrees) in the horizontal plane and the vector to the target is due north (0 degrees). The follower scope would display a right arrow or otherwise indicate that a clockwise rotation is required and would stop the user (via displayed or verbal cues) at the point when the user is pointed at 0 degrees. At that point, the follower scope would determine the vector in the vertical plane. For example, if the follower scope is level but the vector to the target is 10 degrees lower, the follower scope would direct the user to lower the angle of the follower scope until it matches the vector to the target in the vertical plane. The above example assumes that the user would be directed to the target first in the horizontal plane and then in the vertical plane. However, it is possible to simultaneously direct the follower scope in both the horizontal and vertical plan by simultaneously displaying both a right arrow and down arrow. And, because of the GPS/INS device, the follower scope always knows its orientation and direction using GPS compassing.

E. Infrared Sensor/Heat Signature

In addition to a normal optical mode embodiments described above, an alternative embodiment of the scopes incorporate a forward-looking infrared sensor to detect heat signatures of targets. Using the rangefinder, the system detects the location of the target corresponding to the selected heat signature and then in addition to or instead of transmitting an image of the target of interest, the system transmits the heat signature.

F. Non-Visual Displays

Although the preferred embodiment transmits the image and/or heat signature to the other devices in the system, at least a portion of the devices may not have visual displays. In that case, the follower scope may rely simply on directional arrows or other indicia to direct the user of the follower scope to the target.

G. Audio Prompts

In lieu of directional arrows or other indicia to direct the follower scope, a connection between the follower scope and a pair of headphones, connected wired or wirelessly such as by Bluetooth, may be used which directs the use to move the device (e.g., up, down, left, right).

H. Direct Use of Range Information

In the embodiments described above, range information from the rangefinder is not used for identifying the target at the follower scope. Since optical scopes and binoculars focus for variable distances, the guidance to target information may also include indicia to allow the user to know the correct distance to look at or focus on. In the audio embodiment, commands may be provided to focus nearer or further, look closer, or the like. Stated another way, the user is already looking along a vector calculated based on the known target location and the known location of the follower scope. The rangefinder can be used to get an idea of whether you are too far or too close to the target. For example, the target may be one mile away, but the user is currently looking 1.5 miles away.

I. Target Marking

The lead scope may incorporate cross-hairs or other target selection indicia such as a reticle to mark the target. Once marked, the rangefinder detects the distance to the target and the system determines the coordinates of the target and notifies the follower scopes of the target position as described above or communicates with an available network server to store the coordinates of the target.

J. Trigger Switch

In a rifle or gun application, the lead scope may incorporate the switch to send the information to follower scopes into a sensor on or adjacent to the trigger.

K. Overlay for Display

A more complex follower scope may include a higher resolution display and utilize augmented reality techniques to overlay visual information received from the lead scope and indicia directing the follower scope to the target onto an optical field-of-view of the follower scope. An overlay may be implemented by a heads-up display or equivalent or by switching to a complete digital display.

L. Target Image Capture

The image of the target may be captured in a manner substantially identical to a variety of techniques used in digital cameras. For example, at the point in time when the user of the lead scope designates the target, a mirror may fold down and direct the image to an image sensor similar to the operation of a digital SLR. The lead scope may also operate similar to a mirrorless or compact camera which does not use a mirror.

M. Adjustments for Hand Movements

Position movement of the lead scope due to hand movements of the device (e.g., rifle/gun, binoculars) by the user may introduce instability to the system. To address this issue, a touchpad or other pointing device may be mounted on the device and used to move the cross-hairs or other target indicia over the target. Once the target is tagged, the range is determined based on the range to the center of the cross-hairs using the rangefinder. In some cases, and depending on the range finding technology used, it may be necessary to mechanically redirect the rangefinder to point at the target using linear or other silent motors which would make minimal noise. Once the range is determined, the target position calculation is performed and adjusted for the offset between the orientation of the lead scope and the offset to the orientation determined based on the amount that the cross-hairs have been moved off-center.

N. Terrain Obstructions

In some cases, terrain features (e.g. hills, mountains) may be on the path of the vector between the follower scope and the target. For example, if the lead scope is one mile due north of the target and the follower scope is two miles due south, there could be a hill between the follower scope and the target. Detailed topographic maps and navigational tools are readily available. For example, software products such as Terrain Navigator Pro, commercially available from Trimble® subsidiary MyTopo™, Billings, Mont., provides detailed topographical maps of the entire U.S. and Canada and incorporates U.S. Geological survey maps at various scales. Using conventional GPS routing techniques known to those skilled in the art, either a computer in the lead scope or a computer in an intelligent node in the network of connected scopes can overlay the vector between the follower scope and the target onto a topographical map of the area and determine if the vector passes through a terrain feature that would make it impossible for the follower scope to see the target. If an obstruction is present, an indicia that the target is blocked from view may be presented to the user of the follower scope. In some embodiments, using the data from the topographical maps and the location of the target and follower scope, the follower scope may direct the user to move to another position, preferably the closest position, where it would have an unobstructed view of the target.

The computer in the lead scope or the computer in an intelligent node in the network of connected scopes outputs at least one of these information items (i.e., an indicia for display by the second scope that the presumed target is blocked from view, and electronically generated indicators for use by the second scope to prompt the operator of the second scope to move to another position that allows for an unobstructed view of the presumed target) when a determination is made that the vector passes through a terrain feature that would prevent the second scope from viewing the presumed target.

O. Multiple Scopes Acting as Lead Scope

In the second embodiment, there may be situations where multiple scopes send targets at the same time. In the second embodiment, each scope has the capability to be a lead scope or follower scope at any given time, thus creating the possibility that multiple scopes may be sending position information associated with different targets simultaneously. In embodiments where scopes can receive an image of the target transmitted by the lead scope, multiple target images could be displayed in a list and using selector buttons, a pointing device, or by tracking the eye and determining a focus point, the target of interest could be selected by the follower scope and thereafter the follower scope would be directed to the target as previously described. If the follower scope did not have the capability to display the target images received from multiple lead scopes, the user of the follower scope would be presented with a list of available targets and associated annotating information, such as distance to target, time of creation, or originating scope, and have the ability to select a target of interest through the use of selector buttons, a pointing device, or eye tracking. If the follower scope did not have the capability to present the user the list of targets, the processor would select the target based on predetermined criteria or an algorithm which would use various factors to select the best target. These factors could include nearest target, target with least error rate, target matched by the IAMS to a preferred target type such as a particular animal or person identified by facial recognition.

In embodiments where scopes can present digital overlays, the follower scope could support the simultaneous tracking of multiple targets of interest. Instead of selecting a single target of interest from a list of available targets, the user of a follower scope would have the ability to toggle each available target as shown or hidden. If an available target is set to show, indicia would be added to the follower scope overlay, annotated with a label indicating which target of interest it is guiding towards.

In some embodiments, it may be unclear if a scope is sending confirmation that it has identified and pointed at a target previously selected by a lead scope or acting as a lead scope and sending a new target. To eliminate this issue, a user interface may be included to allow the user of the scope to indicate whether it is sending position information associated with a new target or confirmation that it has seen a target that was previously designated by a different target. Alternatively, if images are transmitted with the position data and the system includes an IAMS, the IAMS could compare the images of the targets and determine whether to treat the received position data as associated with a previously designated target or a new target.

It is also possible that the user of a scope could make a mistake and improperly indicate that it has selected a target previously designated by a lead scope when in fact the scope is actually designating a different target. This could occur for a variety of reasons with one example being the same type of animal being within the error box. Ideally, when the target is designated by a scope when another target has previously been designated by a lead scope, the IAMS would have the capability of comparing the two images and determining that the target images have a low probability of being the same target and the that scope is acting as a lead scope and sending data associated with a new target.

P. Game Mode

The network-connected scopes may be used to play a game with scoring maintained by any one of the scopes or a network server. The game may operate over a fixed time interval. In one embodiment, the lead scope sets the target and each follower scope searches for the target. Points are awarded based on the order in which the follower scopes identify the target and/or the amount of time it takes for the follower scope to find the target. A maximum amount of time is provided for the follower scopes to find the target at which point the round ends. Either sequentially or randomly, a new lead scope is then designated to find a target and the next round is played. The winner of the game is the scope with the maximum points at the conclusion of the preset time for the game. Alternatively, the game ends when a target score is achieved and the players are ranked based on their points.

Q. Automatic Target Detection

The IAMS can be used to support the operator of a lead scope by identifying potential targets within the current field-of-view through object classification. Prior art processes exist to analyze image frames and identify objects in the image frame. For example, the GOOGLE® Cloud Vision API provides image analytics capabilities that allows applications to see and understand the content within the images. The service enables customers to detect a broad set of entities within an image from everyday objects (e.g., "sailboat", "lion", "Eiffel Tower") to faces and product logos. Software applications of this type may be used for identifying potential targets within the current field-of-view through object classification.

Using an IAMS-enabled lead scope having object classification functionality, the operator can select the type of target they are looking for from a preset list (e.g. car, person, deer), at which point an image is captured from the lead scope and the IAMS highlights any objects within the view that match the specified object type, such as with a bounding box or highlighted image segment. The lead scope can then be pointed at one of the highlighted potential targets and activated to designate the target.

In an alternative embodiment, the image processing can be continuous, such that as the lead scope is moved around, any objects that are found to match the specified object type are highlighted.

In another embodiment, the automatic target detection is extended to one or more follower scopes using features described in the image simulation and display of section C above. Consider the following example:

1. Automatic target detection is performed using the lead scope as described above.

2. Using the process described in section C above, the IAMS calculates how the target image should appear based on the location of a specific follower scope with respect to the lead scope. The appearance factors in the angle (e.g., same angle (head on), rotated +/−90 degrees (left or right side view), rotated 180 degrees (butt view)) and distance (e.g., same, bigger, or smaller in size, depending upon distance to the target).

3. An image is captured from the field-of-view of the follower scope and automated pattern identification is performed to determine if the expected target image from the lead scope, as it was calculated to appear by the follower scope, is actually in the field-of-view of the follower scope. For example, if a deer is supposed to appear rotated +90 degrees, a deer that is facing the follower scope head on, as determined from the automated pattern recognition, would not likely be the correct target. However, if the deer is supposed to appear rotated +90 degrees, and a deer is determined to be in the field-of-view of the follower scope and is also determined to be rotated +90 degrees, as determined from the automated pattern recognition, the deer is likely to be the correct target.

4. If the expected target image is in the field-of-view of the follower scope, a similar type of bounding box or highlighted image segment appears in the follower scope, and appropriate prompts are provided to the operator of the follower scope to re-position the follower scope from its current target position towards the target image in the bounding box or highlighted image segment.

Figure 5:
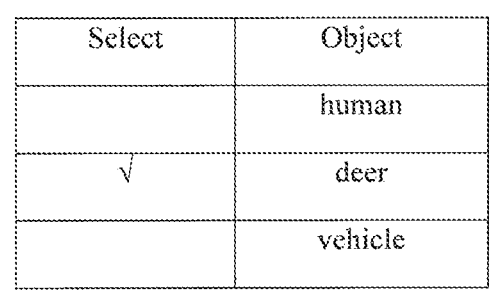

FIG. 5 shows a sample preset list that may be displayed on a display of scope. In this example, the listed objects include a human, a deer and a vehicle. The operator of the scope has selected "deer." Assume that the field-of-view of the scope is analyzed for object detection and the only object appearing in the field-of-view is a single deer at approximately the 1:00 o'clock position. This would result in a field-of-view similar to that shown in FIG. 4C with corresponding instructions to prompt the operator of the scope to move the scope from its current target position to the target position of the deer.

R. Focal Length of Scopes

In the embodiments described above, it is presumed that the scopes all have similar focal lengths. However, if the scopes have different focal lengths, the IAMS must make an appropriate adjustment when determining the size of the object being analyzed in the field-of-view and the size of the object displayed as an image in a follower scope. Preferably, the IAMS receives data regarding the focal lengths of the respective scopes so that any such adjustments can be made.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

S. Flowcharts

Figure 6:
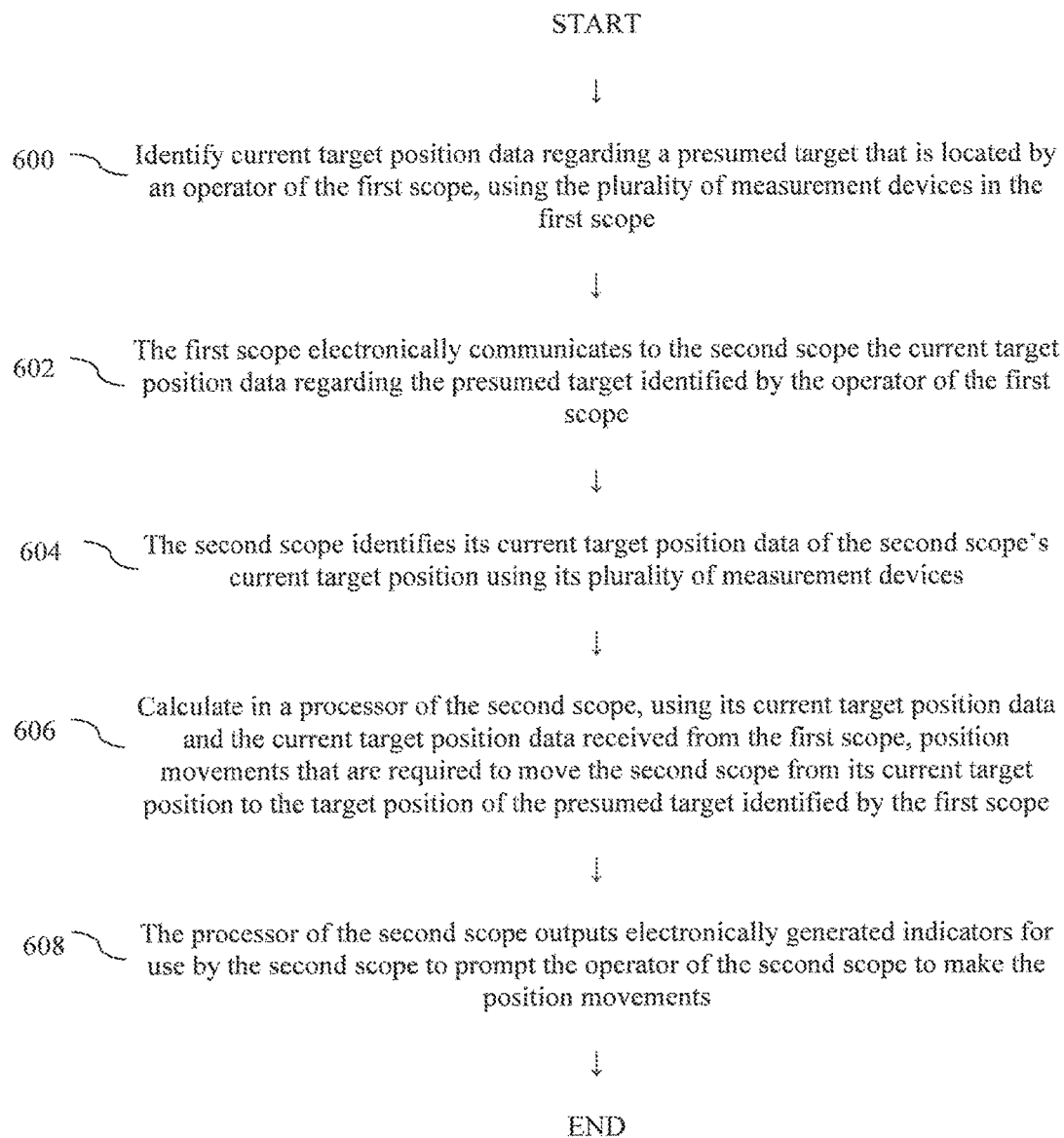
FIGS. 6-8 show flowcharts in accordance with preferred embodiments of the present invention.

FIG. 6 is a flowchart of a process for tracking a single presumed target by a first scope and a second scope located remotely from one another and being moved by separate scope operators, wherein each of the scopes include a plurality of measurement devices configured to provide current target position data. In one preferred embodiment the process is implemented by at least the following steps:

600: Identify current target position data regarding a presumed target that is located by an operator of the first scope, using the plurality of measurement devices in the first scope.

602: The first scope electronically communicates to the second scope the current target position data regarding the presumed target identified by the operator of the first scope.

604: The second scope identifies its current target position data of the second scope's current target position using its plurality of measurement devices.

606: Calculate in a processor of the second scope, using its current target position data and the current target position data received from the first scope, position movements that are required to move the second scope from its current target position to the target position of the presumed target identified by the first scope.

608: The processor of the second scope outputs electronically generated indicators for use by the second scope to prompt the operator of the second scope to make the position movements. The operator of the second scope uses the indicators to re-position the scope from its current target position so as to move towards the target position defined by the current target position data received from the first scope.

Figure 7:
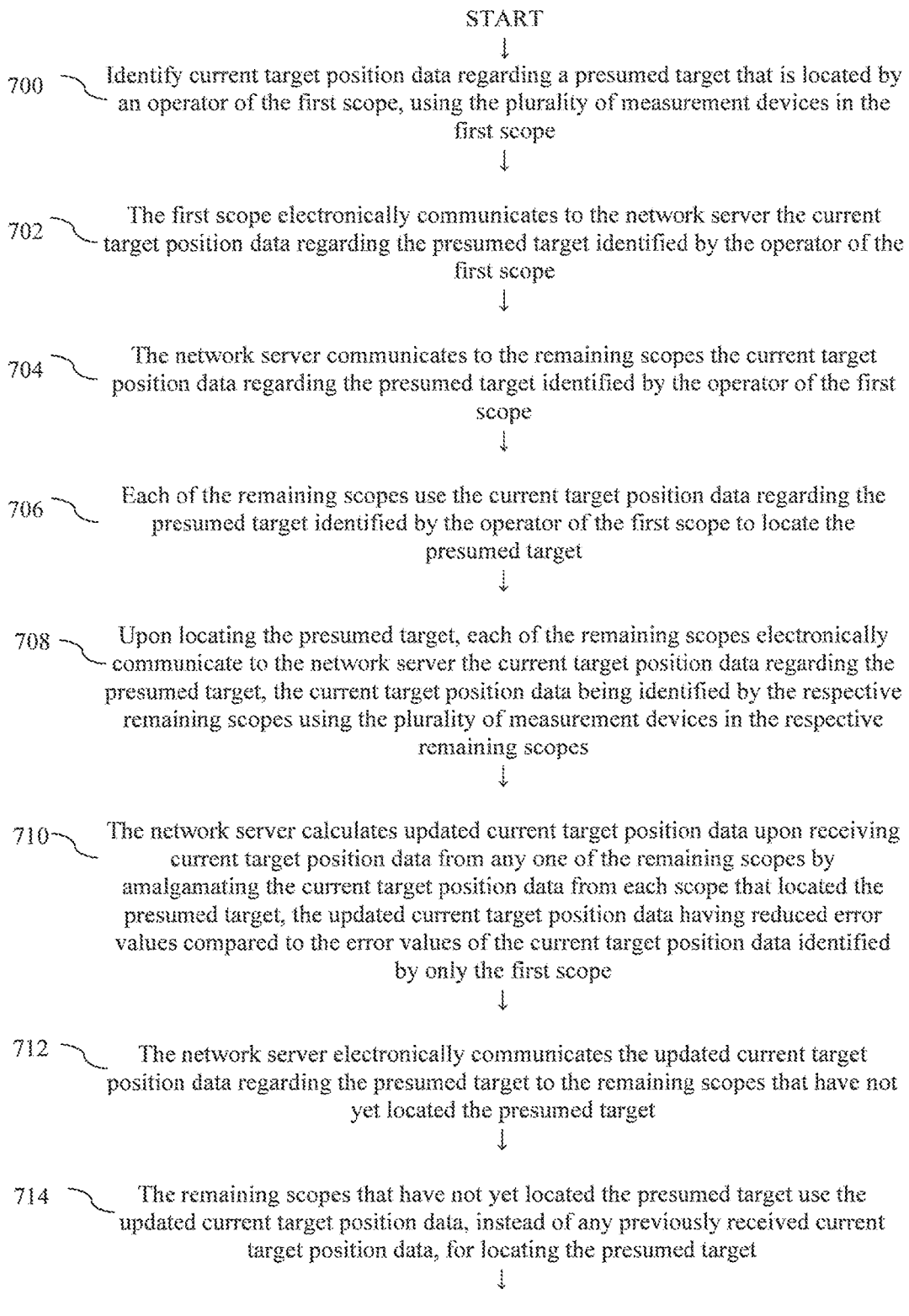

FIG. 7 is a flowchart of a process for tracking a single presumed target by a plurality of scopes located remotely from one another and being moved by separate scope operators, wherein each of the scopes include a plurality of measurement devices configured to provide current target position data, and each of the scopes are in electronic communication with a network server, and the current target position data have error values. In one preferred embodiment the process is implemented by at least the following steps:

700: Identify current target position data regarding a presumed target that is located by an operator of the first scope, using the plurality of measurement devices in the first scope.

702: The first scope electronically communicates to the network server the current target position data regarding the presumed target identified by the operator of the first scope.

704. The network server communicates to the remaining scopes the current target position data regarding the presumed target identified by the operator of the first scope.

706: Each of the remaining scopes use the current target position data regarding the presumed target identified by the operator of the first scope to locate the presumed target.

708: Upon locating the presumed target, each of the remaining scopes electronically communicate to the network server the current target position data regarding the presumed target, the current target position data being identified by the respective remaining scopes using the plurality of measurement devices in the respective remaining scopes.

710: The network server calculates updated current target position data upon receiving current target position data from any one of the remaining scopes by amalgamating the current target position data from each scope that located the presumed target, the updated current target position data having reduced error values compared to the error values of the current target position data identified by only the first scope.

712: The network server electronically communicates the updated current target position data regarding the presumed target to the remaining scopes that have not yet located the presumed target.

714: The remaining scopes that have not yet located the presumed target use the updated current target position data, instead of any previously received current target position data, for locating the presumed target.

Figure 8:
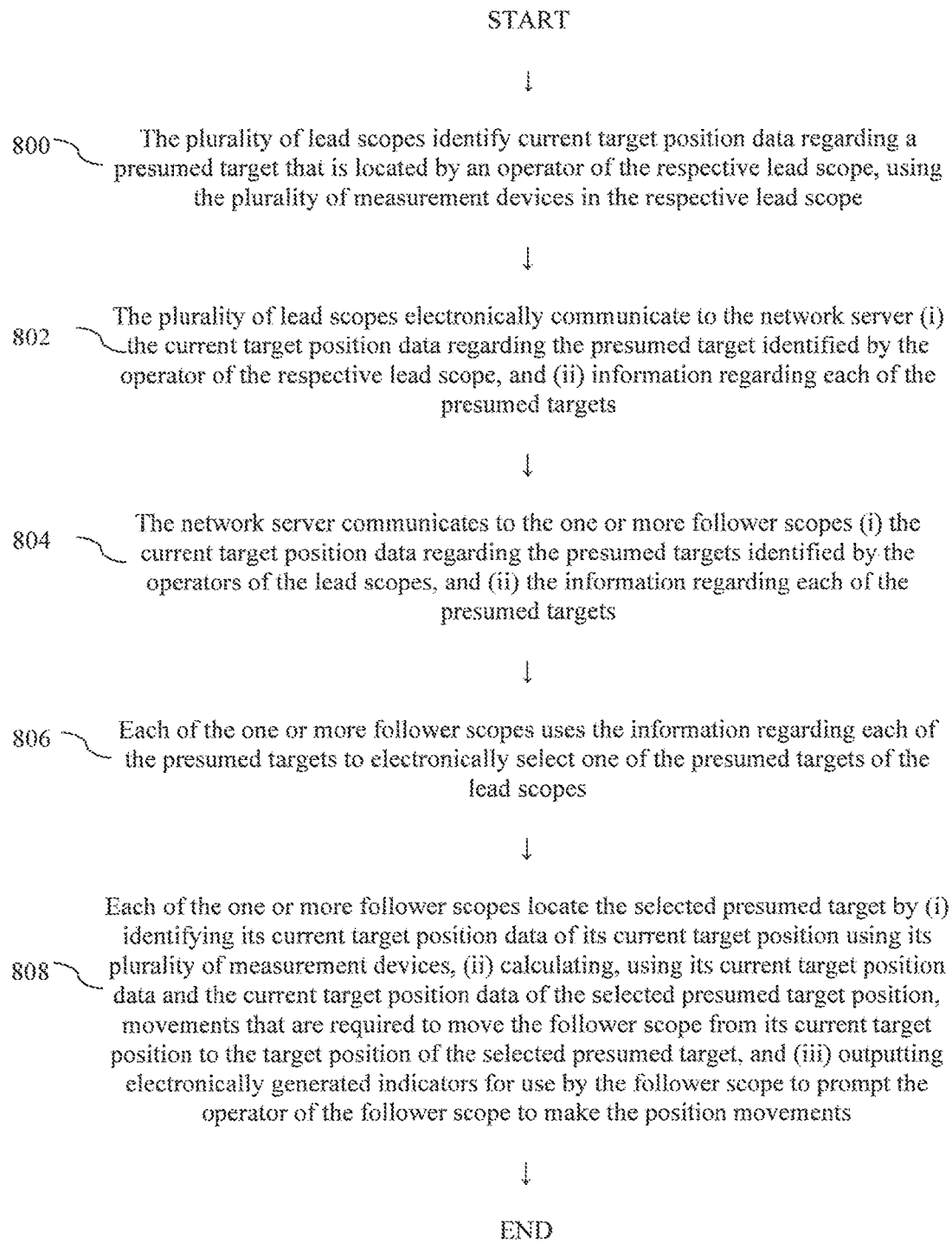

FIG. 8 is a flowchart of a process for tracking a plurality of presumed targets by a plurality of lead scopes and one or more follower scopes located remotely from one another and being moved by separate scope operators, wherein each of the scopes include a plurality of measurement devices configured to provide current target position data, and each of the scopes are in electronic communication with a network server. In one preferred embodiment the process is implemented by at least the following steps:

800: The plurality of lead scopes identify current target position data regarding a presumed target that is located by an operator of the respective lead scope, using the plurality of measurement devices in the respective lead scope.

802: The plurality of lead scopes electronically communicate to the network server (i) the current target position data regarding the presumed target identified by the operator of the respective lead scope, and (ii) information regarding each of the presumed targets.

804: The network server communicates to the one or more follower scopes (i) the current target position data regarding the presumed targets identified by the operators of the lead scopes, and (ii) the information regarding each of the presumed targets.

806: Each of the one or more follower scopes uses the information regarding each of the presumed targets to electronically select one of the presumed targets of the lead scopes.

808: Each of the one or more follower scopes locate the selected presumed target by (i) identifying its current target position data of its current target position using its plurality of measurement devices, (ii) calculating, using its current target position data and the current target position data of the selected presumed target position, movements that are required to move the follower scope from its current target position to the target position of the selected presumed target, and (iii) outputting electronically generated indicators for use by the follower scope to prompt the operator of the follower scope to make the position movements. The operator of the follower scope uses the indicators to reposition the follower scope from its current target position so as to move towards the target position defined by the current target position data of the selected presumed target.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A scope configured to be a lead scope or a follower scope, the scope comprising:
   (a) a plurality of measurement devices configured to collect data that is necessary to identify current target position data for a presumed target that is located by an operator of the scope;
   (b) a network interface configured to:
      (i) electronically communicate current target position data of the presumed target identified by the operator of the scope to an electronic network for sending via the electronic network to a follower scope when the scope is configured to act as a lead scope, and
      (ii) receive via the electronic network current target position data of a presumed target that was previously identified by a lead scope and communicated to the electronic network when the scope is configured to act as a follower scope; and
   (c) a processor, in communication with the network interface and the plurality of measurement devices, configured to:
      (i) calculate the current target position data of the scope from the data collected by the plurality of measurement devices,
      (ii) calculate, using the current target position data of the scope and the current target position data received from the lead scope, position movements that are required to move the scope from its current target position to the target position of the presumed target identified by the lead scope, and
      (iii) output electronically generated indicators for use by the scope to prompt the operator of the scope to make the position movements,
      wherein the indicators are used by the operator of the scope to re-position the scope from its current target position so as to move towards the target position defined by the current target position data received from the lead scope when the scope is configured to act as a follower scope.

2. The scope of claim 1 further comprising:
   (d) a digital image sensor configured to capture a digital image of the presumed target identified by the operator of the scope when the scope is configured to act as a lead scope,
      wherein the network interface is further configured to:
      (iii) electronically communicate the digital image of the presumed target to the electronic network for sending via the electronic network to the follower scope when the scope is configured to act as the lead scope; and
   (e) a display that displays the digital image of the presumed target,
      wherein the digital image of the presumed target is used by the operator of the scope to assist in moving towards the target position defined by the current target position data received from the lead scope when the scope is configured to act as a follower scope.

3. The scope of claim 2 wherein the digital image sensor is an infrared sensor that captures a heat signature of the presumed target when the scope is configured to act as a lead scope, and the display displays the heat signature as the digital image of the presumed target when the scope is configured to act as a follower scope.

4. The scope of claim 1 further comprising:
   (d) an audiovisual display device in communication with the processor that outputs the electronically generated indicators.

5. The scope of claim 1 wherein when the scope is configured to act as a follower scope, the processor is further configured to:
   (iv) repeat the calculations and output new indicators upon receiving updated current target position data of the presumed target from a lead scope, or upon detecting updated current target position data of the scope.

6. The scope of claim 1 wherein the plurality of measurement devices include at least the following devices:
   (i) a Global Positioning System (GPS) device, or a GPS-aided Inertial Navigation System (GPS/INS) configured to provide latitude, longitude and altitude of the first or second scope,
   (ii) a compass configured to provide the direction of the presumed target relative to the position of the first or second scope, and
   (iii) an orientation sensor configured to provide attitude data.

7. The scope of claim 1 wherein the scope is one of binoculars, a telescope, and a spotting scope.

8. The scope of claim 1 wherein the current target position data received from the other scope is either (i) three-dimensional location data of the presumed target, or (ii) raw measurement data sufficient to calculate the three-dimensional location data of the presumed target during calculation of the position movements.

9. A scope configured to track a presumed target, the scope comprising:
   (a) a plurality of measurement devices configured to collect data that is necessary to identify current target position data for a presumed target that is located by an operator of the scope; and
   (b) a network interface configured to receive via the electronic network current target position data of a presumed target that was previously identified by another scope and communicated to the electronic network; and
   (c) a processor, in communication with the network interface and the plurality of measurement devices, configured to:
      (i) calculate the current target position data of the scope from the data collected by the plurality of measurement devices,
      (ii) calculate, using the current target position data and the current target position data received from the other scope, position movements that are required to move the scope from its current target position to the target position of the presumed target identified by the other scope, and (iii) output electronically generated indicators for use by the scope to prompt the operator of the scope to make the position movements,
wherein the indicators are used by the operator of the scope to re-position the scope from its current target position so as to move towards the target position defined by the current target position data received from the other scope.

10. The scope of claim 9 wherein the plurality of measurement devices include at least the following devices:
(i) a Global Positioning System (GPS) device, or a GPS-aided Inertial Navigation System (GPS/INS) configured to provide latitude, longitude and altitude of the first or second scope,
(ii) a compass configured to provide the direction of the presumed target relative to the position of the first or second scope, and
(iii) an orientation sensor configured to provide attitude data.

11. A scope configured to track a presumed target, the scope comprising:
(a) a plurality of measurement devices configured to collect data that is necessary to identify current target position data for a presumed target that is located by an operator of the scope; and
(b) a network interface configured to receive via the electronic network current target position data of a plurality of presumed targets that were previously identified by one or more other scopes and communicated to the electronic network; and
(c) a processor, in communication with the network interface and the plurality of measurement devices, configured to:
(i) calculate the current target position data of the scope from the data collected by the plurality of measurement devices,
(ii) receive a selection of one of the plurality of presumed targets received from the one or more other scopes to be tracked by the scope, and
(iii) calculate, using the current target position data of the scope and the current target position data of the selected presumed target, position movements that are required to move the scope from its current target position to the target position of the selected presumed target, and
(iv) output electronically generated indicators for use by the scope to prompt the operator of the scope to make the position movements,
wherein the indicators are used by the operator of the scope to re-position the scope from its current target position so as to move towards the target position defined by the current target position data of the selected presumed target.

12. The scope of claim 11 further comprising:
(e) a user interface configured to allow the operator of the scope to make the selection of one of the plurality of presumed targets to be tracked by the scope.

13. The scope of claim 11 wherein the processor is further configured to automatically select one of the plurality of presumed targets to be tracked by the scope based on predetermined criteria, or an algorithm.

14. The scope of claim 11 wherein the plurality of measurement devices include at least the following devices:
(i) a Global Positioning System (GPS) device, or a GPS-aided Inertial Navigation System (GPS/INS) configured to provide latitude, longitude and altitude of the first or second scope,
(ii) a compass configured to provide the direction of the presumed target relative to the position of the first or second scope, and
(iii) an orientation sensor configured to provide attitude data.

* * * * *